(12) United States Patent
Combs (10) Patent No.: US 9,714,391 B2
(45) Date of Patent: Jul. 25, 2017

(54) WASTE TO FUEL SYSTEM

(71) Applicant: Johnny D. Combs, Justin, TX (US)

(72) Inventor: Johnny D. Combs, Justin, TX (US)

(*) Notice: Subject to any disclaimer, the term of this patent is extended or adjusted under 35 U.S.C. 154(b) by 160 days.

(21) Appl. No.: 14/827,016

(22) Filed: Aug. 14, 2015

(65) Prior Publication Data
US 2016/0046880 A1 Feb. 18, 2016

Related U.S. Application Data

(60) Provisional application No. 62/037,351, filed on Aug. 14, 2014.

(51) Int. Cl.

| | |
|---|---|
| *C10G 55/06* | (2006.01) |
| *C10G 11/14* | (2006.01) |
| *C10G 31/10* | (2006.01) |
| *C10B 49/14* | (2006.01) |
| *C10B 53/07* | (2006.01) |
| *C10G 1/02* | (2006.01) |
| *C10G 1/10* | (2006.01) |
| *C10G 11/02* | (2006.01) |
| *C10B 57/04* | (2006.01) |
| *B01J 35/12* | (2006.01) |
| *C10G 1/00* | (2006.01) |

(52) U.S. Cl.
CPC .............. *C10G 55/06* (2013.01); *C10B 49/14* (2013.01); *C10B 53/07* (2013.01); *C10B 57/04* (2013.01); *C10G 1/002* (2013.01); *C10G 1/02* (2013.01); *C10G 1/10* (2013.01); *C10G 11/02* (2013.01); *C10G 11/14* (2013.01); *C10G 31/10* (2013.01); *B01J 35/12* (2013.01); *Y02P 20/143* (2015.11)

(58) Field of Classification Search
CPC ......... C10B 49/14; C10B 53/07; C10G 55/06; C10G 11/14; C10G 7/00; C10G 31/10
See application file for complete search history.

(56) References Cited

U.S. PATENT DOCUMENTS

| | | | | |
|---|---|---|---|---|
| 3,916,617 A | * | 11/1975 | McKenzie | ................ C10J 3/57 252/373 |
| 4,017,271 A | * | 4/1977 | Barclay | ................ C10G 19/00 252/373 |
| 4,284,616 A | * | 8/1981 | Solbakken | ............. B29B 17/02 201/2.5 |
| 5,057,189 A | * | 10/1991 | Apffel | .................... C09C 1/482 202/113 |
| 2007/0084755 A1 | * | 4/2007 | Malone | ............ C10M 175/0025 208/179 |
| 2015/0151274 A1 | * | 6/2015 | Lee | ........................ C10B 53/00 422/187 |

* cited by examiner

*Primary Examiner* — Matthew Merkling
(74) *Attorney, Agent, or Firm* — Keith E. Taber (57) ABSTRACT

A waste to fuel system is disclosed that provides for simplified pyrolysis and cracking of useful hydrocarbons from waste by using molten salt as a heat transfer medium in the pyrolysis stage and using molten salt mixed with catalyst in the cracking stage.

10 Claims, 12 Drawing Sheets

WASTE TO FUEL SYSTEM

BACKGROUND

Field of the Invention

The present invention relates generally to systems that convert waste materials into useable fuels.

Description of Related Art

Pyrolysis (heat without oxygen) of organic and carbon materials has been around since ancient times, and is how Noah made tar pitch for the Ark and how the Egyptians made tar for stones in the pyramids. Petroleum was known before petroleum Colonel Edwin Drake drilled for oil in 1858 in Titusville, Pa., but few believed it had any useful purpose or that there was enough of it to matter. So almost all of the existing oil companies produced what was called "wood oil" or oil produced by the pyrolysis of wood along with whale oil as the oil sources of the 1800's. Even after Drake hit oil, wood oil would continue in use until the early 1900's until people accepted that sufficient petroleum oil existed to count on economically. During World War II, millions of vehicle ran on the synthetic gas produced by pyrolysis of wood, especially in Europe where petroleum was scarce.

Since the 1980's, research and development of systems that can convert waste plastics and other materials (including hazardous materials such as PCBs) have been patented and developed into production systems. Many of the systems focused on fast pyrolysis (heating the material quickly) to produce a synthetic gas (syngas) for energy production. Some of the systems focused on oil production as the primary product producing oils from heating oils, specialty chemicals, and petroleum substitute oils and fuels. The major players are addressed in the paper titled Environmental and Economic Analysis of Emerging Plastics Conversion Technologies Final Project Report, Jan. 10, 2012 RTI Project No. 0212876.000 prepared by RTI International for the American Chemistry Council.

As the technology has improved systems have become increasingly better at converting non-fuel materials into fuels, but they have also become far more complex and more expensive. This increased complexity and cost makes the best systems unavailable to many populations where the technology would be very useful.

A need exists, therefore, for a system that can convert a broad range of waste materials and feed stock into useful hydrocarbons with reduced complexity and expense.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The problems presented in waste to fuel conversion are addressed by simplifying the system and adjusting the scale to a more manageable size. Several factors contribute to this simplification such as using a different heat transfer medium, using entrained catalyst, heating a smaller vessel, and reducing the number of mechanical components where ever possible.

The system uses molten salt as the heat exchange mechanism to transfer heat to the waste plastic material to vaporize it. Molten salt is 8-9 times more effective in storing and transferring heat than heated air, but not as effective as high-pressure steam in heat transfer (industry standard). On balance molten salt provides very good heat transfer without the danger and complication that high-pressure steam would introduce to the system.

Small vessel with a high heat transfer rate allow for a smaller footprint and some simplification as compared to a large vessel with a low heat transfer rate. By using a smaller vessel size to vaporize the material, the system is able to vaporize the material in 20-30 minutes as compared to larger systems, which can take 8-12 hours. This approach allows the system to process more material per day in a smaller footprint than existing systems.

The process is also much simpler than existing systems in that mechanical systems have been minimized, using a compression auger as an air seal to input the feedstock (replacing rotary vales, slide gates, etc. . . .) and a compression auger as an air seal on the biochar discharge. Everything is operated by electronic controls from a central operating control system.

Other objects, features, and advantages of the present invention will become apparent with reference to the drawings and detailed description that follow.

DETAILED DESCRIPTION

All references cited herein are incorporated by reference to the maximum extent allowable by law. To the extent a reference may not be fully incorporated herein, it is incorporated by reference for background purposes and indicative of the knowledge of one of ordinary skill in the art.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
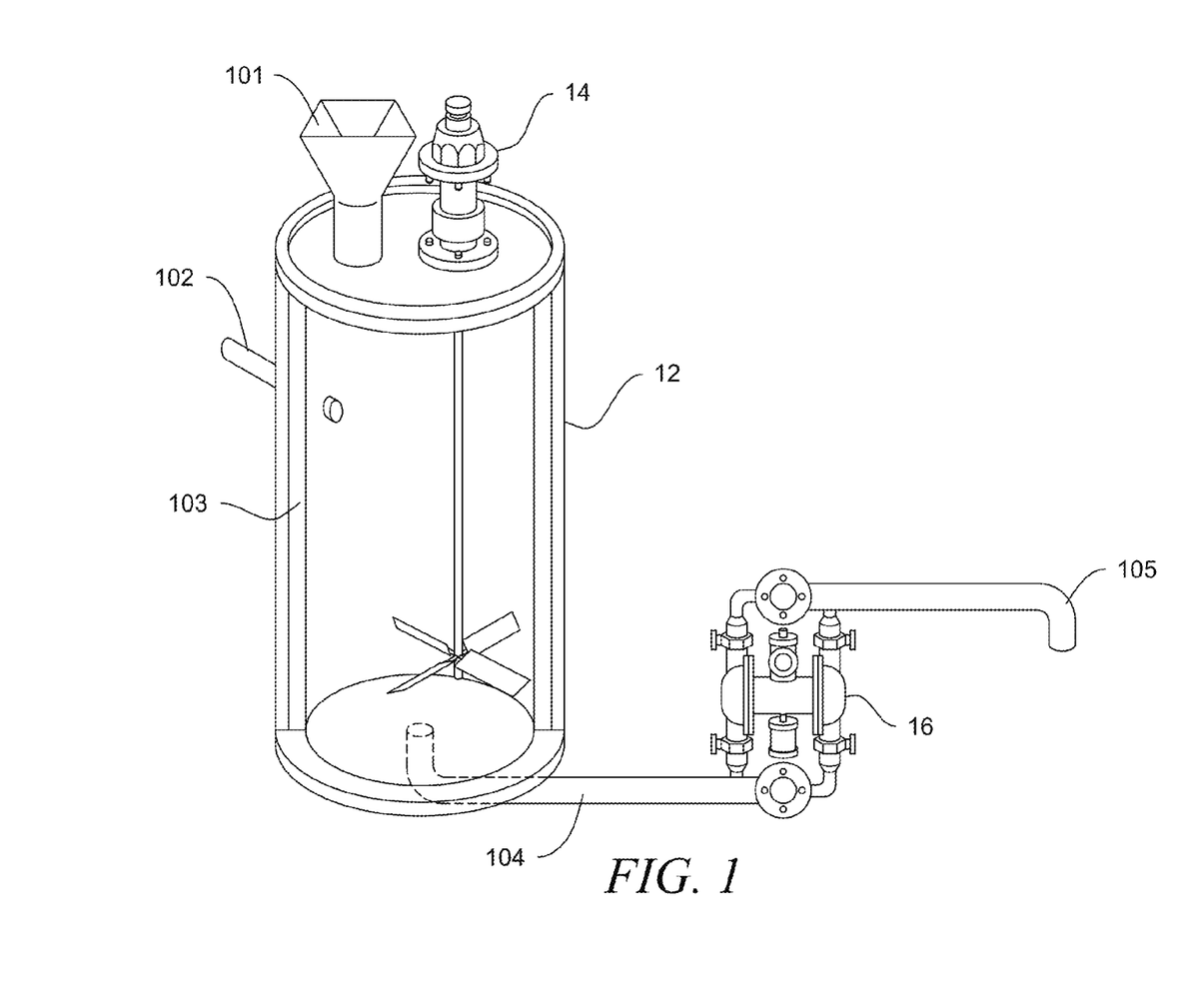
FIG. 1 is a schematic of a premix chamber.

FIG. 1 is a schematic of a premix chamber 12. Premix chamber 12 is used to mix shredded plastic or other shredded waste with paraffin to create slurry. An appropriate mixer 14 is used to thoroughly mix the shredded waste and the paraffin before the slurry is pumped by pump 16 from the premix chamber 12 to the pyrolysis chamber 18. Shredded plastic and other shredded waste is introduced into premix chamber 12 through waste inlet 101. Paraffin is added to premix chamber 12 through paraffin inlet 102. Baffles 103 increase the mixing efficiency of mixer 14 within premix chamber 12. Slurry outlet 104 allows the slurry to flow from premix chamber 12 to slurry pump 16.

Figure 2:
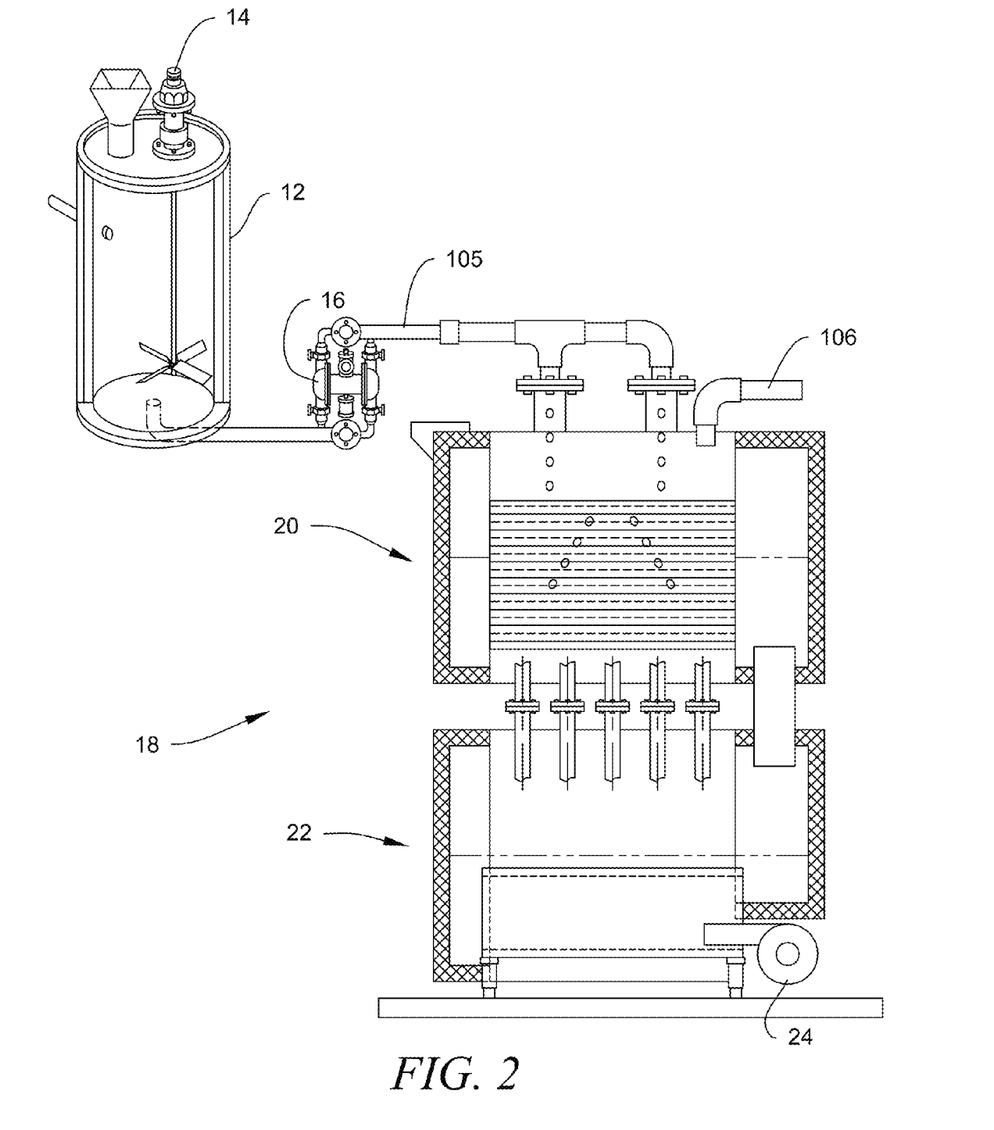
FIG. 2 is a schematic of the premix chamber of FIG. 1 and a pyrolysis chamber.

FIG. 2 is a schematic of the premix chamber 12 of FIG. 1 and a pyrolysis chamber 18. Pyrolysis chamber 18 has two main parts, an upper premelt chamber 20 and a lower pyrolysis chamber 22. A burner 24 is located near the bottom of lower pyrolysis chamber 22 and the burner 24 heats the lower pyrolysis chamber 22 and upper pre-melt chamber 20. In one embodiment lower pyrolysis chamber 22 uses molten salt as a heat transfer medium to achieve very consistent high temperatures without causing corrosion to the chamber parts or requiring high pressure steam, as is discussed in more detail with regards to FIG. 3. Slurry is pumped by pump 16 into slurry output 105 at the top of upper pre-melt chamber 20 where it is quickly heated to a temperature that allows some of the slurry to turn to vapor. The slurry that is not vaporized runs down to the lower pyrolysis chamber 22 where it is further heated and largely converted to vapor. The slurry that is not vaporized in lower pyrolysis chamber 22 is largely comprised of asphalt or biochar that can be removed and sold as valuable products. The vapor from the upper pre-melt chamber 20 and the lower pyrolysis chamber 22 is pulled out by vacuum through vapor outlet 106 to be further processed.

Figure 3A:
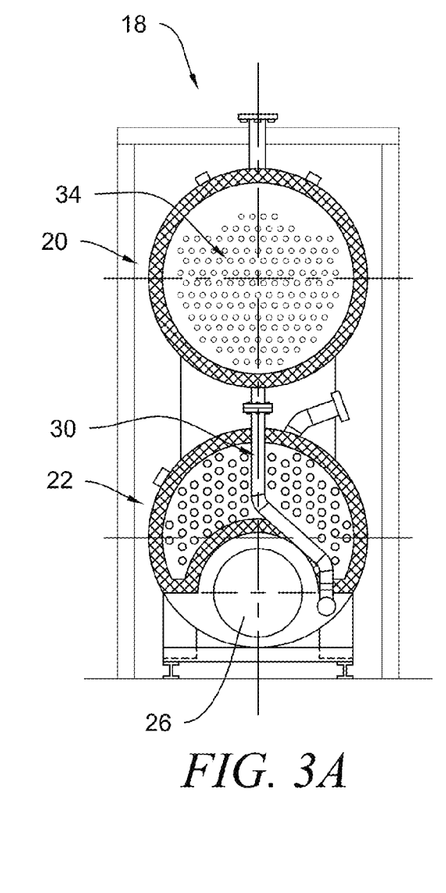
FIG. 3A is a front view schematic of the pyrolysis chamber with molten salt of FIG. 2.
Figure 3B:
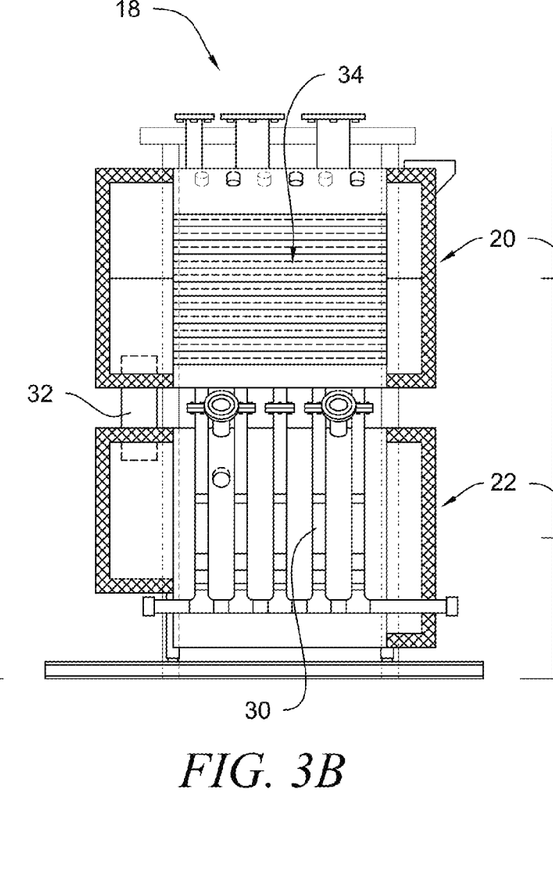
FIG. 3B is a side view schematic of the pyrolysis chamber with molten salt of FIG. 2.
Figure 3C:
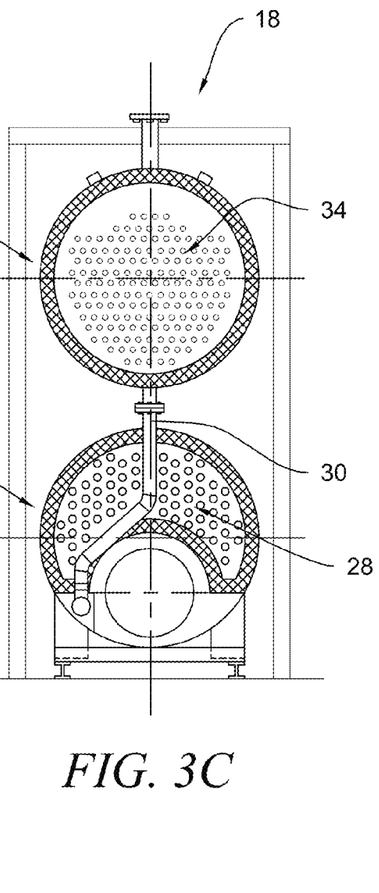
FIG. 3C is a rear view schematic of the pyrolysis chamber with molten salt of FIG. 2.

FIG. 3 is a schematic of a pyrolysis chamber 18 with molten salt as a heat transfer medium for the lower pyrolysis chamber 22. FIG. 3 provides a front view, a side view and a rear view as labeled. Burner 24 is mounted at the front of lower chamber 22 so that hot gases from the burner are directed to the rear of the lower chamber along a large burner chamber 26 along the bottom of lower pyrolysis chamber 22. At the rear of the lower pyrolysis chamber 22 the hot gases are redirected through burner tubes 28 back to the front of the lower pyrolysis chamber 22. Burner tubes 28 pass through molten salt filling the lower pyrolysis chamber 22. The molten salt is heated from the bottom by the large burner chamber 26 and by the burner tubes 28. Running vertically through the lower pyrolysis chamber 22 are pyrolysis tubes 30. Pyrolysis tubes 30 are heated by the molten salt in lower chamber 22. After traversing the burner tubes 28 the hot exhaust gases pass through manifold 32 from lower pyrolysis chamber 22 to upper pre-melt chamber 20. In upper pre-melt chamber 20 the hot gases traverse from the front to the back in pre-melt tubes 34. Pre-melt tubes 34 are surrounded by slurry that is being heated directly by the heat of the exhaust gases running through pre-melt tubes 34. So, the burner 24 creates hot gases that flow up through the pyrolysis chamber 18 from the bottom of lower pyrolysis chamber 22 to the top of upper pre-melt chamber 20 while slurry is fed into the top of pyrolysis chamber 18 and is heated to a vapor as it descends from the top of upper pre-melt chamber 20 down into lower pyrolysis chamber 22. After the full vaporization process the remains of the slurry are largely asphalt tars and biochar, which are removed to be sold as valuable products. The paraffin is fed back into the premix chamber 12 to assist with moving more waste through the pyrolysis chamber 18.

By using paraffin mixed with waste and pumping the paraffin/waste mixture into the pyrolysis chamber 18 air is kept out of the pyrolysis chamber. Maintaining an airtight seal is important to maintaining effective pyrolysis of waste.

Figure 4:
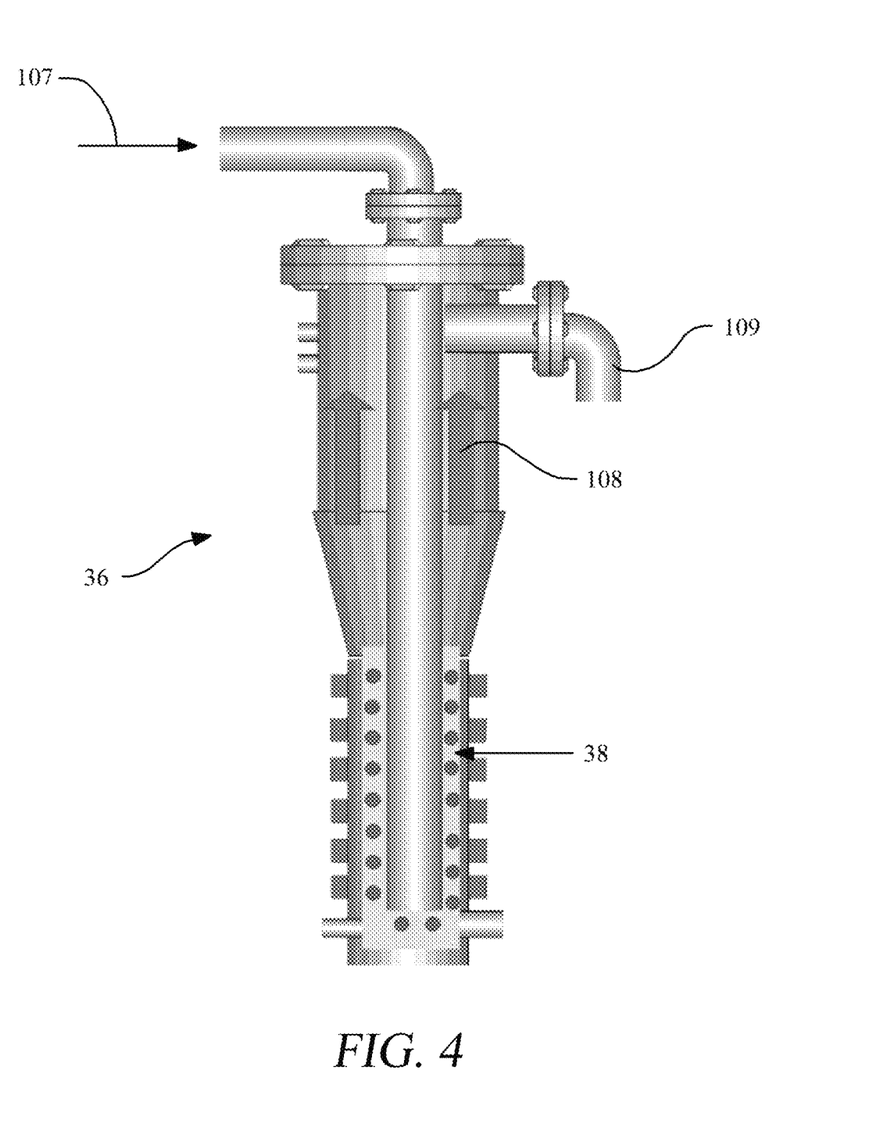
FIG. 4 is a schematic of a molten salt catalyst chamber.

FIG. 4 is a schematic of a molten salt catalyst chamber 36. Vapor from the pyrolysis chamber 18 is fed through vapor inlet 107 at the top of the catalyst chamber 36 and the vapor is drawn through the molten salt catalyst 38 and the cracked vapor 108 exits the cracked vapor outlet 109. Molten salt catalyst 38 is made up of a molten salt, such as Dynalene, and a catalyst, such as zeolite or aluminum silicate. The catalyst is mixed with the molten salt at a mixture of between 25% and 50% catalyst to salt. The mixture depends on the type of waste being processed and the oxygen content of the waste. The molten salt strips oxygen out of the vapors while the catalyst cracks long carbon chain hydrocarbons into smaller carbon chain hydrocarbons. Depending on the products desired the catalyst may need to be sorted with a sieve prior to mixture to get the best cracking effect. By combining the cracking with molten salt oxidation the vapors do not have to be cooled and heated multiple times as is standard in most waste to fuel systems. The hot pyrolysis vapors are fed directly into the molten salt catalyst chamber 36 and pulled directly through the molten salt catalyst 38 to create a cracked vapor that can be distilled into various products.

Figure 5:
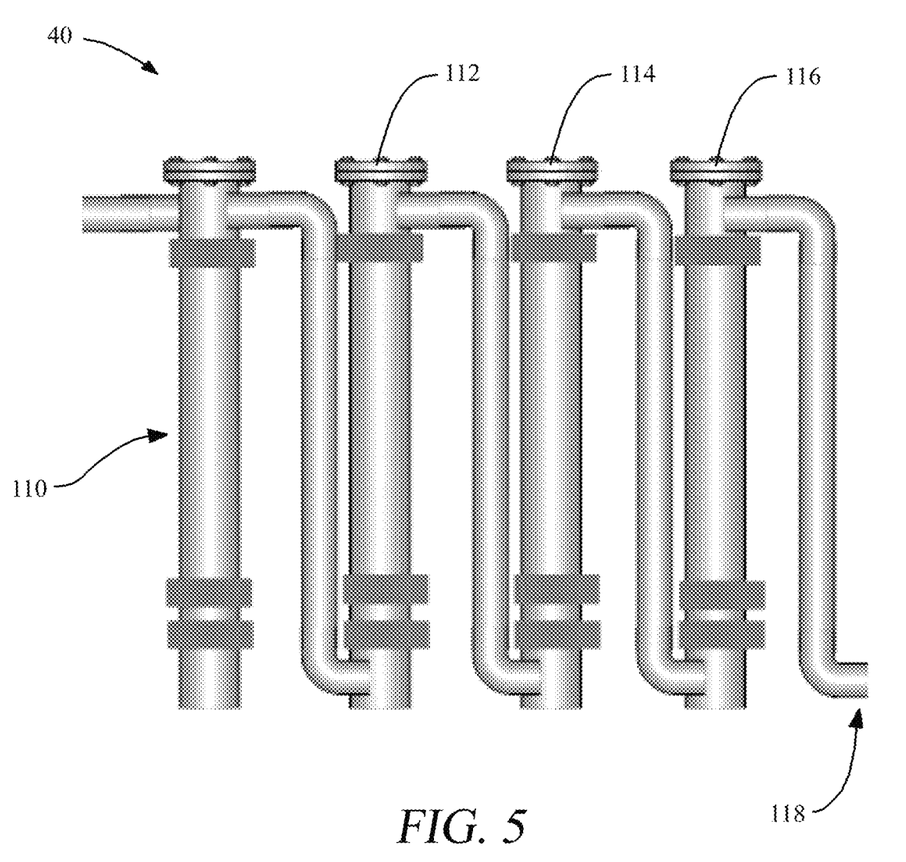
FIG. 5 is a schematic of distillation chambers.

FIG. 5 is a schematic of distillation chambers 40. The cracked gas from the molten salt catalyst chamber 36 flows into the distillation chambers 110, 112, 114, and 116 where separate products are distilled based on their vaporization temperature. Paraffin 110, heavies 112, waters 114 and lights 116 are removed from the vapor to leave a syngas 118 at the end of the distillation process. The water can be further treated and used as industrial water. The paraffin may be used as further feed stock into the premix chamber as need. The heavies and lights are further processed to remove contaminates in a centrifuge and then added back to each other at a ratio of about two parts heavies to one part lights to make diesel fuel. The syngas has many known uses and may be used to fire burner 24 in some situations if an efficient syngas burner can be sourced that provides adequate heat.

FIGS. 6-12 show an alternative to pyrolysis chamber 18, pyrolysis chamber 200.

Figure 6:
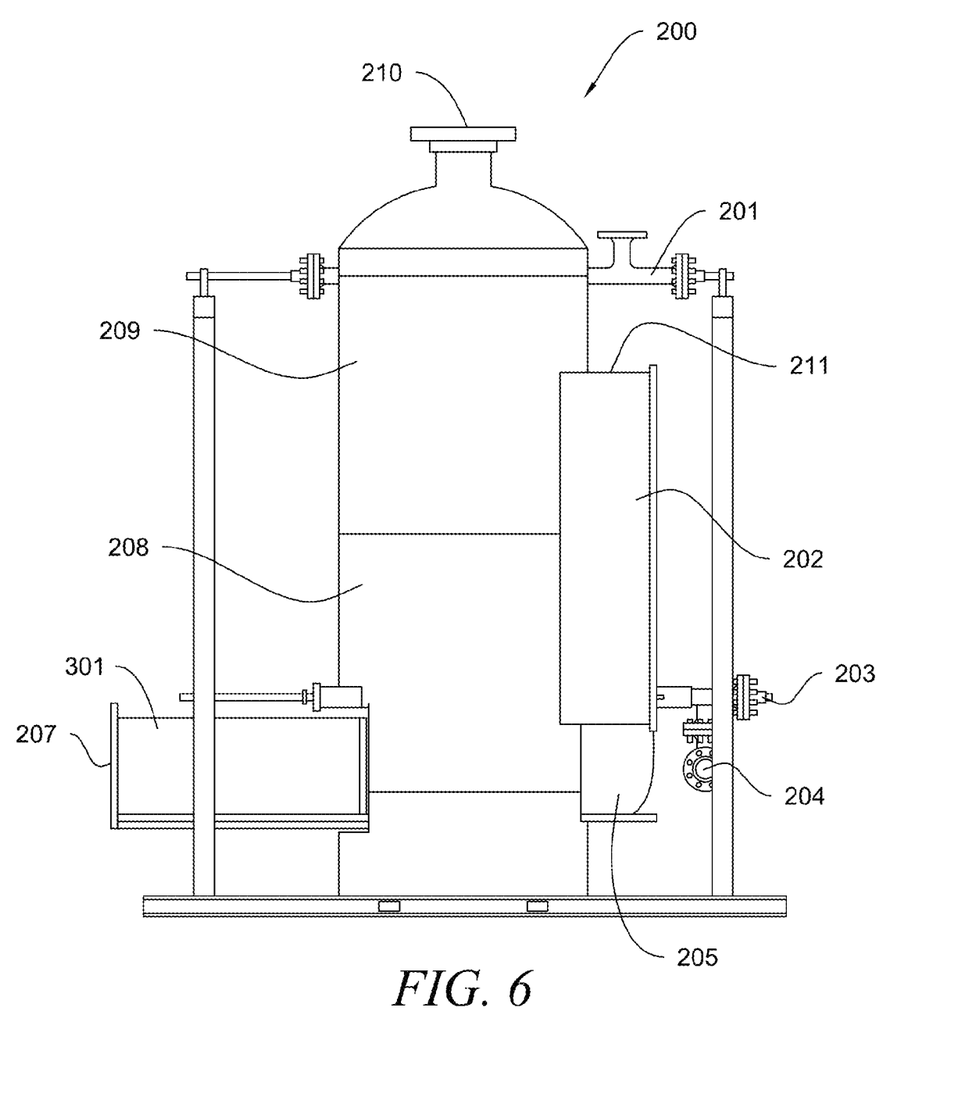
FIG. 6 is a side view schematic of another pyrolysis chamber with molten salt.

FIG. 6 shows feedstock is input into pyrolysis chamber 200 through means of a compression auger 201 that compresses the feedstock to form an air seal on material entering the vapor chamber 209. Once inside vapor chamber 209, the feedstock is vaporized as it descends through a series of troughs surrounded by molten salt 208. The non-vaporized fraction (Biochar) is removed from the system through compression augers 203 that remove the Biochar for use as a coal substitute. Hot air is input into the system by means of a combustion burner 207 that can also burn the syngas created by the process to lower the costs of operating the system. The heat from the combustion air is transferred into the molten salt heated in the molten salt chamber 208 that in turn transfers the heat to the feedstock causing it to vaporize. The vaporized feedstock exits the system through the vapor out port 210 of the vapor section 209 where the vapor is directed to the molten salt catalytic reactor 38 for treatment. The combustion air exhausts from the system through an exhaust port 211.

Figure 7:
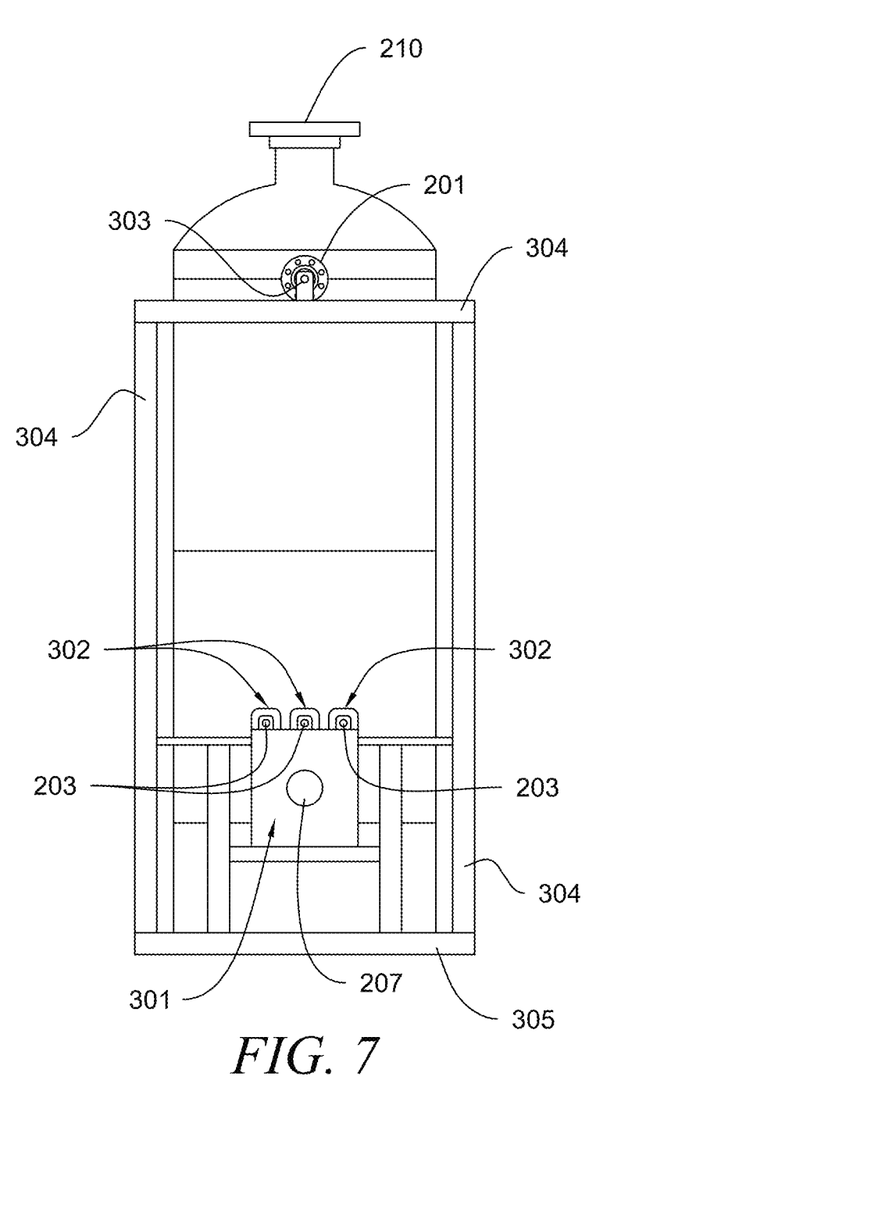
FIG. 7 is a front view schematic of the pyrolysis chamber with molten salt of FIG. 6.

FIG. 7 shows the combustion burner 207 is mounted to a combustion refractory 301 that is independent of the molten salt chamber 208. Combustion air is fed into the pyrolysis chamber 200 by the combustion burner 207, transfers heat to molten salt as it travels through the air tubes 604 before exhausting from the pyrolysis chamber 200. The biochar augers 203 are supported by biochar auger bearings 302 on a bearing support frame 304 to ensure the augers 203 do not wear and run true. The feedstock input auger 201 is supported by a feedstock input bearing 303 on bearing support frame 304 as well. Pyrolysis chamber 200 is supported by a support skid 305. The vapors from pyrolysis chamber 200 exit through the vapor out port 210.

Figure 8:
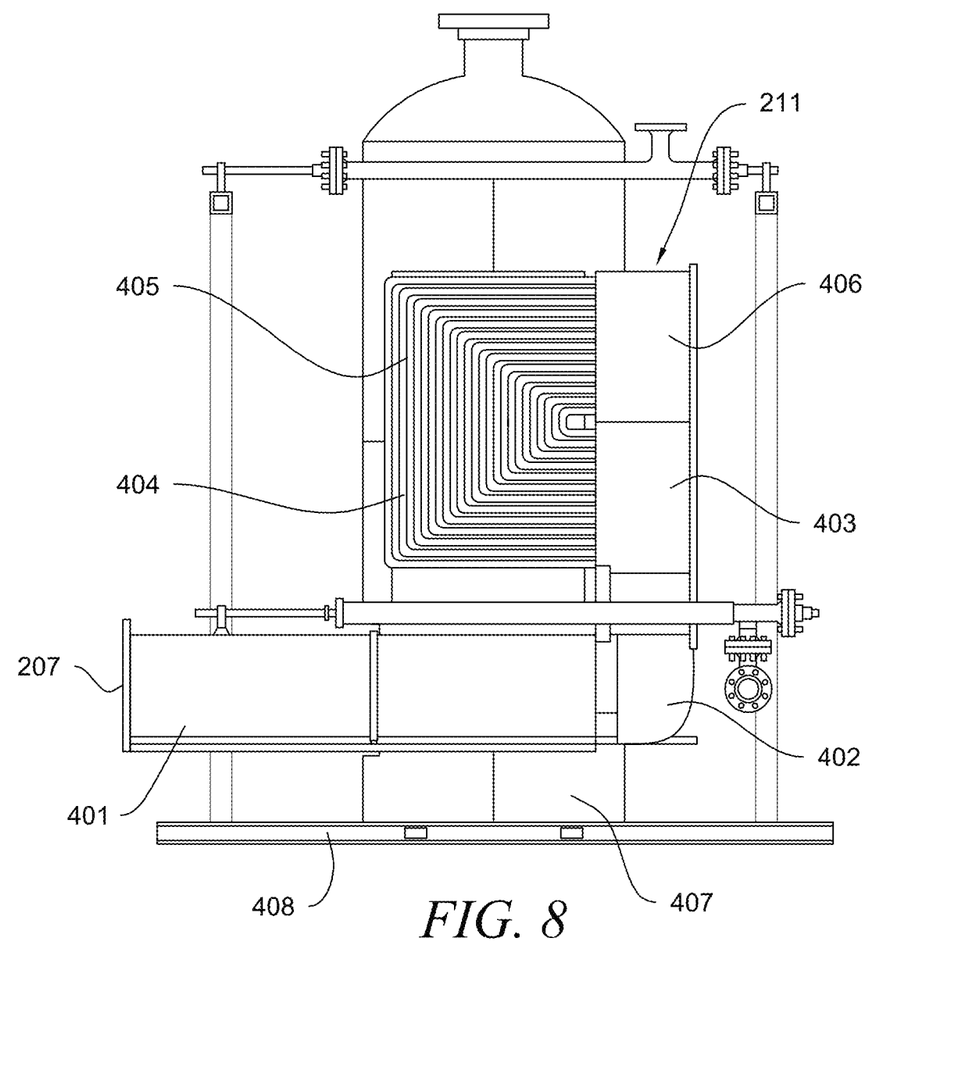
FIG. 8 is a schematic of the airflow through the pyrolysis chamber of FIG. 6.

FIG. 8 shows the combustion burner 207 fires through a combustion firebox 401 before turning upward into the lower air return 403 through the combustion air scoop 402. Once the combustion air enters the lower air return 403, the combustion air is forced into the lower tube bundle 404 before traveling through the upper tube bundle 405 then discharging into the upper air return 406 before discharging though the combustion air exhaust 211. Combustion firebox 401 is supported by a support ring 407 attached to a support skid 408.

Figure 9:
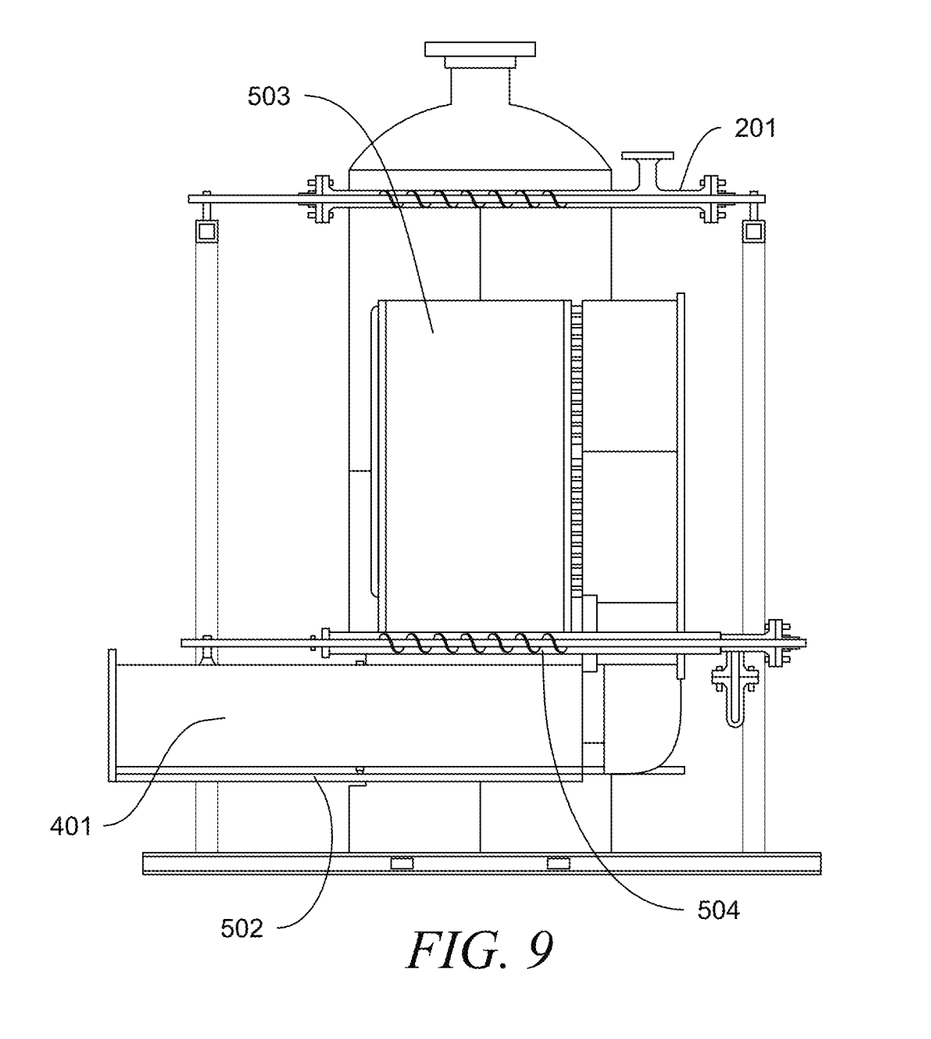
FIG. 9 is a schematic of the firebox support system of the pyrolysis chamber of FIG. 6.

FIG. 9 shows combustion firebox 401 is supported on firebox support rails 502 which allow firebox 401 to expand freely due to thermal expansion of combustion firebox 401 caused by the combustion burner 207. The feedstock auger 201 compresses the feedstock into the system where it travels through the feedstock trough 503 before discharging the remaining feedstock that didn't vaporize (biochar) through the biochar auger 4.

Figure 10:
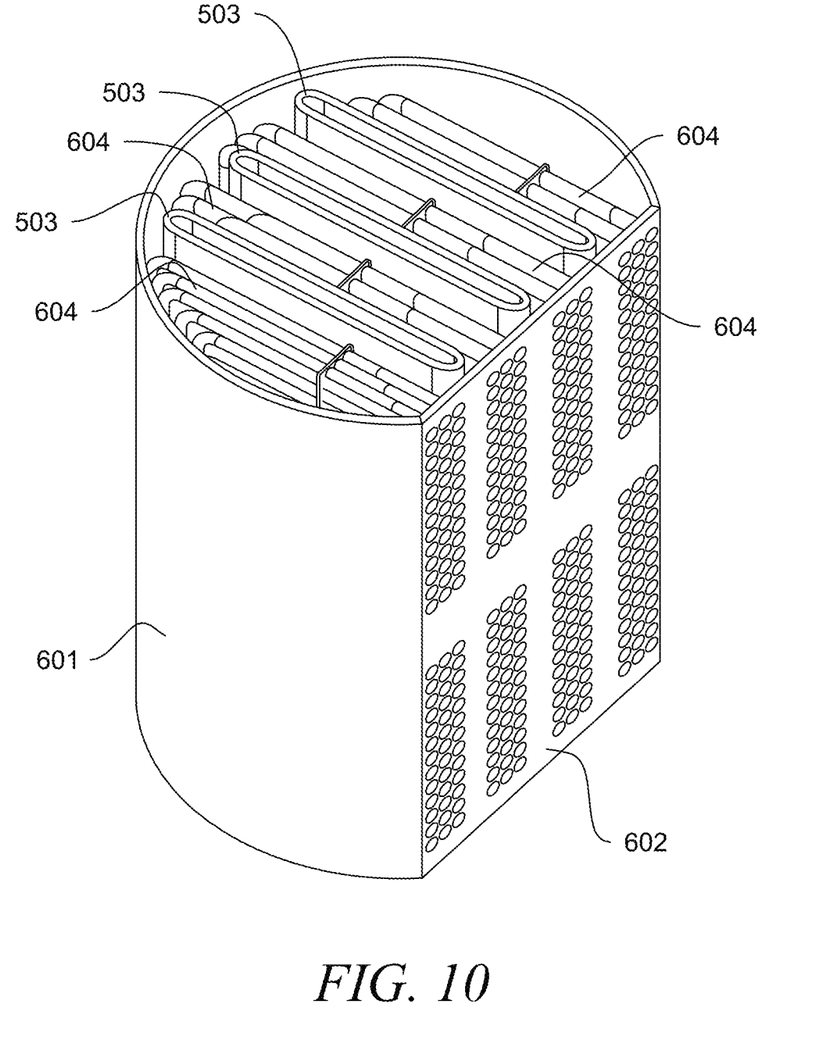
FIG. 10 is a schematic of the molten salt chamber of the pyrolysis chamber of FIG. 6.

FIG. 10 shows the molten salt is contained inside a shell 601 connected to a tubesheet 602 that the combustion air tubes 604 are connected to. The feedstock moves down through the feedstock troughs 503 where the heat from the combustion air is transferred through molten salt vaporizes the feedstock. Shell 601 contains molten salt that is heated by the hot air passing through air tubes 604 and transfers that heat to troughs 503 and the feedstock in troughs 503 is vaporized.

Figure 11:
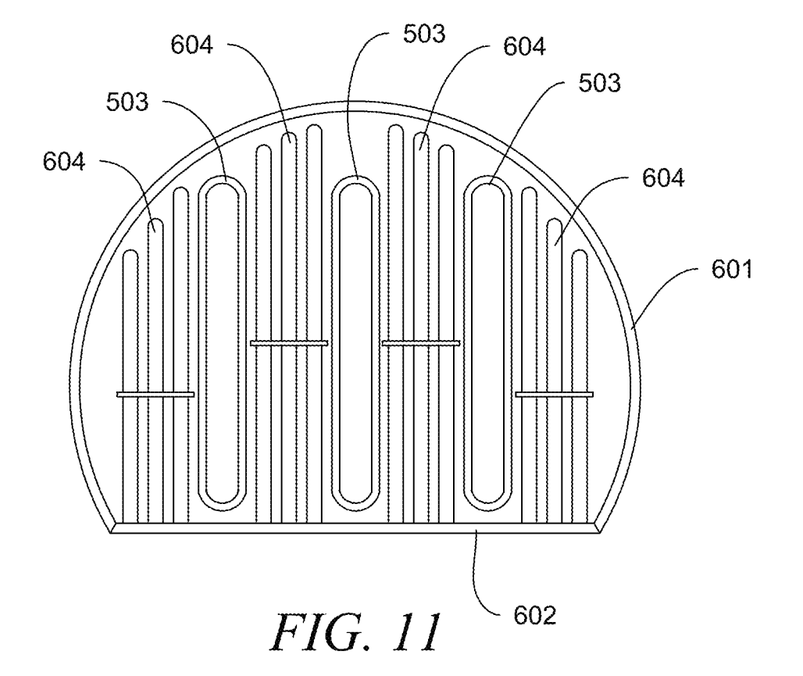
FIG. 11 is a top view schematic of the molten salt chamber the pyrolysis chamber of FIG. 6.

FIG. 11 shows the combustion air flow through the openings in the tubesheet 602 flowing through the combustion air tubes 604 where the heat is transferred to the molten salt in the shell 601. The heated molten salt transfers the heat through the feedstock troughs 503 where the feedstock is vaporized.

Figure 12:
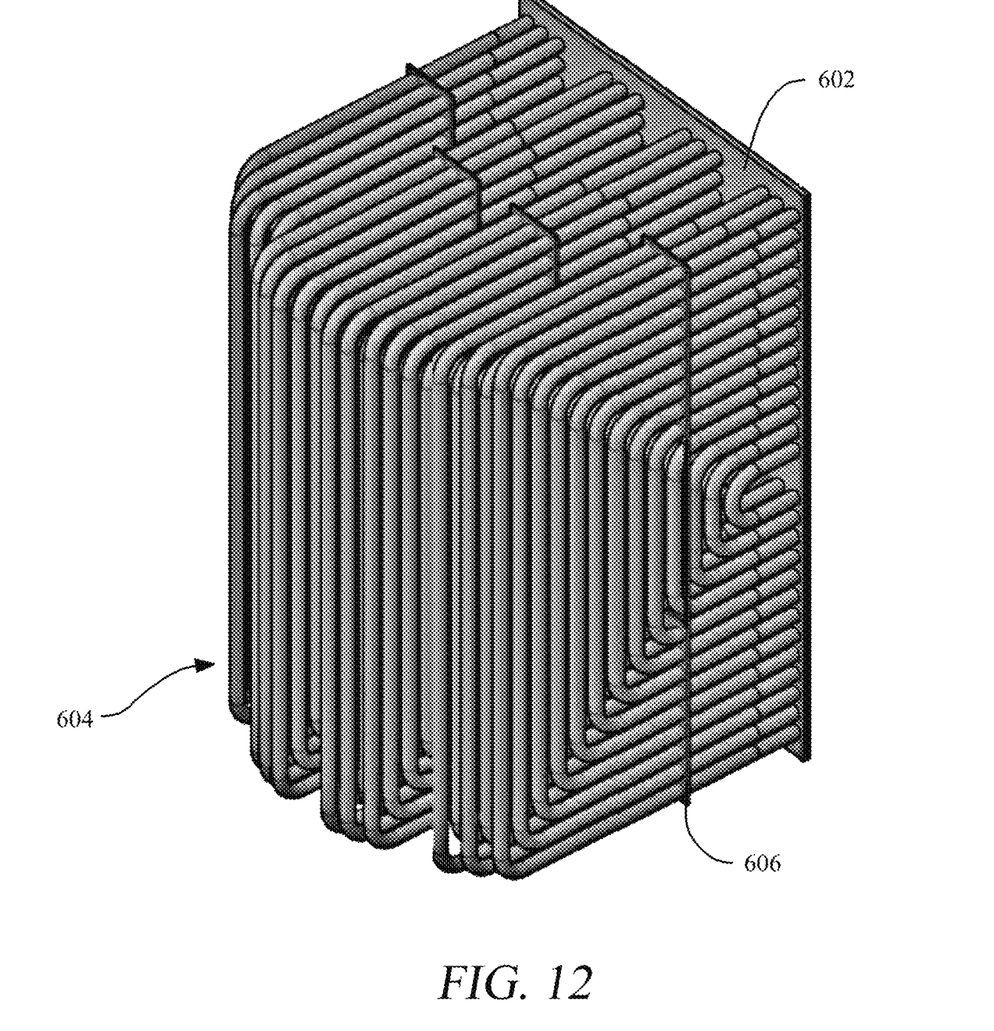
FIG. 12 is a schematic of the combustion air tube bundle the pyrolysis chamber of FIG. 6.

FIG. 12 shows the combustion air enters the combustion air tubes 604 through openings in the tubesheet 602 and flows through the combustion air tubes 604 bent 180 degrees in a "U" shape before discharging. The combustion air tubes are held in place by tube spacers 606 which allow the combustion air tubes to expand freely without hitting each other.

The above description goes over the general concept of a small footprint low cost and simple system for converting waste to fuel. There are many novel aspects that come together to make this system work well as a whole. One or more of the aspects may be used alone or they may be all combined for best effect.

It should be apparent from the foregoing that an invention having significant advantages has been provided. While the invention is shown in only a few of its forms, it is not just limited but is susceptible to various changes and modifications without departing from the spirit thereof.

I claim:
1. A system for converting waste to fuel, the system comprising:
   a premix chamber where waste is mixed with paraffin to create a slurry;
   a pyrolysis chamber comprised of an upper pre-melt chamber and a lower pyrolysis chamber:
      the upper pre-melt chamber receiving the slurry from the premix chamber which is heated to a point where some of the slurry begins to vaporize and the remainder of the slurry is melted;
      the lower pyrolysis chamber receiving the melted slurry from the upper pre-melt chamber which is further heated to temperatures sufficient to vaporize most of the slurry, except for some remaining asphalt tars and biochars;
   a molten salt catalyst chamber where vapors from the pyrolysis chamber are pulled through a column of molten salt mixed with a catalyst, removing oxygen from the vapors and cracking long carbon chain hydrocarbons into shorter carbon chain hydrocarbons, creating cracked vapors; and
   a plurality of distillation chambers separate the cracked vapors into paraffin, heavies, water, lights, and syngas.

2. The system of claim 1 wherein:
   the lower pyrolysis chamber uses molten salt as the primary heat transfer medium.

3. The system of claim 1 wherein:
   the paraffin from at least one of the distillation chambers is fed into the premix chamber.

4. The system of claim 1 wherein:
   the waste is one of:
      waste plastic;
      paper and plastic municipal solid waste;
      biomass; and
      organic municipal solid waste.

5. The system of claim 1 further comprising:
   a centrifugal cleaner that removes particulates from the heavies and lights;
   a mixer for mixing a ratio of heavies and lights to create diesel fuel, renewable crude or other renewable petroleum products.

6. A system for converting waste to fuel, the system comprising:
   a premix chamber where waste is mixed with paraffin to create a slurry;
   a pyrolysis chamber comprised of an upper vapor chamber and a lower molten salt chamber:
      the vapor chamber receiving the slurry from the premix chamber which is heated to a point where some of the slurry begins to vaporize and the remainder of the slurry is melted;
      the molten salt receiving the melted slurry from the upper pre-melt chamber which is further heated to temperatures sufficient to vaporize most of the slurry, except for some remaining asphalt tars and biochars;
   a molten salt catalyst chamber where vapors from the pyrolysis chamber are pulled through a column of molten salt mixed with a catalyst, removing oxygen from the vapors and cracking long carbon chain hydrocarbons into shorter carbon chain hydrocarbons, creating cracked vapors; and
   a plurality of distillation chambers separate the cracked vapors into paraffin, heavies, water, lights, and syngas.

7. The system of claim 6 wherein:
the molten salt chamber contains molten salt heated by airtubes and troughs running through the molten salt that contain the melted slurry.
8. The system of claim 6 wherein:
the paraffin from at least one of the distillation chambers is fed into the premix chamber.
9. The system of claim 6 wherein:
the waste is one of:
   waste plastic;
   paper and plastic municipal solid waste;
   biomass; and
   organic municipal solid waste.
10. The system of claim 6 further comprising:
a centrifugal cleaner that removes particulates from the heavies and lights;
a mixer for mixing a ratio of heavies and lights to create diesel fuel, renewable crude or other renewable petroleum products.

\* \* \* \* \*